(12) United States Patent
Shimada et al.

(10) Patent No.: US 7,008,219 B2
(45) Date of Patent: Mar. 7, 2006

(54) BOIL-OFF GAS PROCESSING SYSTEM USING ELECTRIC HEATER

(75) Inventors: Toshiaki Shimada, Utsunomiya (JP); Takahiro Kuriiwa, Utsunomiya (JP); Yoshio Nuiya, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 111 days.

(21) Appl. No.: 10/214,747

(22) Filed: Aug. 7, 2002

(65) Prior Publication Data

US 2003/0031970 A1 Feb. 13, 2003

(30) Foreign Application Priority Data

Aug. 9, 2001 (JP) ............................ P2001-242339

(51) Int. Cl.
*F23D 21/00* (2006.01)
*F23N 5/02* (2006.01)
*F17C 9/04* (2006.01)
*F17C 13/02* (2006.01)

(52) U.S. Cl. .................. 431/215; 431/202; 431/5; 431/7; 431/11; 431/28; 431/170; 431/89; 431/208

(58) Field of Classification Search ............... 431/208, 431/7, 170, 263, 5, 202, 11, 28, 89; 126/91 A
See application file for complete search history.

(56) References Cited

U.S. PATENT DOCUMENTS

| 2,999,534 | A | * | 9/1961 | Wagner ...................... 431/254 |
| 3,199,505 | A | * | 8/1965 | Lloyd .......................... 126/95 |
| 3,253,641 | A | * | 5/1966 | Gutzeit ........................ 431/41 |
| 3,817,687 | A | * | 6/1974 | Cavallero et al. ............ 431/202 |
| 3,897,193 | A | * | 7/1975 | Kattan et al. .................. 431/5 |
| 3,914,095 | A | * | 10/1975 | Straitz, III .................. 431/202 |
| 3,999,936 | A | * | 12/1976 | Hasselmann ................ 431/202 |

(Continued)

FOREIGN PATENT DOCUMENTS

DE 3402160 * 8/1985

(Continued)

*Primary Examiner*—Carl D. Price
(74) *Attorney, Agent, or Firm*—Lahive & Cockfield, LLP; Anthony A. Laurentano

(57) ABSTRACT

A boil-off gas processing system for reliably burning a boil-off gas. The system processes a boil-off gas produced from a liquid hydrogen tank which is built in a hydrogen fueled vehicle. The system includes a mixing device for introducing air into a discharge passage through which the boil-off gas from the liquid hydrogen tank passes and for mixing the air and the boil-off gas and outputting a mixed gas; a catalytic combustor for burning the mixed gas which was mixed by the mixing device, the catalytic combustor having an inlet through which the mixed gas is introduced and an outlet for discharging combustion gas; an electric heater provided at the inlet side of the catalytic combustor; and a control section for controlling energizing of the electric heater.

7 Claims, 6 Drawing Sheets

U.S. PATENT DOCUMENTS

| | | | |
|---|---|---|---|
| 4,009,985 A | * 3/1977 | Hirt | 431/5 |
| 4,063,874 A | * 12/1977 | Stary et al. | 431/350 |
| 4,087,228 A | * 5/1978 | Datis | 431/5 |
| 4,292,020 A | * 9/1981 | Hirt | 431/5 |
| 4,680,004 A | * 7/1987 | Hirt | 431/5 |
| 5,107,906 A | * 4/1992 | Swenson et al. | 141/11 |
| 5,364,262 A | * 11/1994 | Phillips | 431/202 |
| 5,421,719 A | * 6/1995 | Saito et al. | 431/7 |
| 5,540,208 A | * 7/1996 | Kikutani | 123/518 |
| 5,938,427 A | * 8/1999 | Suzuki et al. | 431/208 |
| 6,065,957 A | * 5/2000 | Kondo et al. | 431/116 |

FOREIGN PATENT DOCUMENTS

| | | | |
|---|---|---|---|
| JP | 59-225212 | * | 12/1984 |
| JP | 03-75408 | * | 3/1991 |
| JP | 5-180397 | | 7/1993 |
| WO | WO 00/31461 | * | 6/2000 |
| WO | WO 00/47463 | * | 8/2000 |

* cited by examiner

BOIL-OFF GAS PROCESSING SYSTEM USING ELECTRIC HEATER

BACKGROUND OF THE INVENTION

1. Field of the Invention

The present invention relates to a boil-off gas processing system for burning and discharging a boil-off gas produced from liquid hydrogen, and in particular, to a system built into a vehicle, where the vehicle is driven by a device using hydrogen, such as a hydrogen fueled engine or a fuel cell.

2. Description of the Related Art

In an example structure of conventional fuel cells, a solid polymer electrolyte membrane is placed between an anode and a cathode, and a hydrogen gas functioning as a fuel gas is supplied to the anode while air or the like which functions as an oxidizing gas is supplied to the cathode. The chemical energy produced by the oxidation reduction reaction of these gases is directly extracted as electrical energy. Such a solid polymer electrolyte membrane fuel cell has a high energy-output efficiency and is environmentally clean; thus, this type of the fuel cell is often employed in motor vehicles or the like.

In order to supply hydrogen to such a fuel cell, (i) pure hydrogen stored in a storage device (a high-pressure hydrogen tank, an alloy tank for hydrogen storage, a liquid hydrogen tank, or the like) may be supplied, or (ii) a hydrocarbon fuel may be reformed by a fuel reformer into a reformed gas including hydrogen, thereby supplying this reformed gas.

As for the former method for supplying pure hydrogen, liquid hydrogen has become the focus of attention and been investigated as a source of hydrogen supply to a vehicle using a fuel cell or hydrogen fueled engine (i.e., a vehicle using hydrogen as a fuel) because of its high energy-storage density and also because liquid hydrogen can be charged into a fuel tank at relatively high speed.

However, liquid hydrogen has an extremely low boiling point of −253° C., and in a tank (built in a vehicle) for storing liquid hydrogen, a boil-off gas is produced when liquid hydrogen is vaporized due to heat from the outside air. The produced boil-off gas causes increase in the pressure in the tank; thus, it is necessary to suitably discharge and process the boil-off gas.

In order to process the boil-off gas, Japanese Unexamined Patent Application, First Publication No. Hei 5-180397 discloses a technique of storing a boil-off gas, which is produced during transportation of liquid hydrogen by using a tanker, in a hydrogen storage alloy which can absorb the boil-off gas. The hydrogen storage alloy has a relatively high storage capability per unit volume and is preferably used for boil-off gas processing systems.

However, if a vehicle has not been used and driven for a long period, a considerable amount of boil-off gas is produced. In order to store all the produced boil-off gas, a very large hydrogen storage alloy tank is necessary, which is not preferable because a boil-off gas processing system built into a vehicle should be small and light.

All of the produced boil-off gas may not be processed by a hydrogen storage alloy or the like. Here, direct discharge of the remaining boil-off gas towards the atmosphere is not preferable, and a technique for burning and discharging the remaining gas by using a catalytic combustor has been investigated.

However, as explained above, the temperature of boil-off gas is very low, and even if such boil-off gas is introduced into a catalytic combustor, the catalyst may not have an temperature necessary for activation. In such a case, no catalytic reaction occurs and the boil-off gas may be discharged without burning.

SUMMARY OF THE INVENTION

In consideration of the above circumstances, an object of the present invention is to provide a boil-off gas processing system for immediately activating a catalyst and reliably burning a boil-off gas.

Therefore, the present invention provides a boil-off gas processing system for processing a boil-off gas produced from a liquid hydrogen tank (e.g., a liquid hydrogen tank 1 in an embodiment explained below) which is built in a hydrogen fueled vehicle, the system comprising:

a mixing device (e.g., an ejector 6 in the embodiment explained below) for introducing air into a discharge passage (e.g., a boil-off gas discharge passage 10 in the embodiment explained below) through which the boil-off gas from the liquid hydrogen tank passes and for mixing the air and the boil-off gas and outputting a mixed gas;

a catalytic combustor (e.g., a catalytic combustor 7 in the embodiment explained below) for burning the mixed gas which was mixed by the mixing device, the catalytic combustor having an inlet through which the mixed gas is introduced and an outlet for discharging combustion gas;

an electric heater (e.g., an electric heater 8 in the embodiment explained below) provided at the inlet side of the catalytic combustor; and a control section (e.g., an ECU 20 in the embodiment explained below) for controlling energizing of the electric heater.

According to the above structure, the mixed gas, which was mixed by the mixing device, can be first heated by the electric heater and then be introduced to the catalyst in the catalytic combustor. Therefore, it is possible to quickly increasing the temperature of the catalyst to the activation temperature and to immediately activate the catalyst. Accordingly, the boil-off gas can be reliably burned and it is possible to prevent a pre-burned boil-off gas from being discharged.

In the present invention, the hydrogen fueled vehicle means a vehicle which is driven by a device using hydrogen (as a fuel), such as a hydrogen fueled engine or a fuel cell.

As a typical example, the boil-off gas processing system further comprises:

a discharge valve (e.g., a release valve 5 in the embodiment explained below) which is attached to the discharge passage and is opened when the pressure in the liquid hydrogen tank reaches a predetermined pressure, wherein when the discharge valve is open, the boil-off gas is introduced into the mixing device, wherein the control section controls energizing of the electric heater according to an open or closed state of the discharge valve.

According to this structure, the electric heater can be energized so as to heat the mixed gas only when the discharge valve is open and the boil-off gas is drawn into the catalytic combustor via the mixing device, that is, the electric heater cannot be energized while the discharge valve is closed and no boil-off gas is drawn into the catalytic combustor. Therefore, the power consumption of the electric heater can be minimized.

As another typical example, the boil-off gas processing system further comprises:

a temperature measuring section (e.g., a temperature sensor 15 in the embodiment explained below) for measuring a temperature of the catalytic combustor, wherein the control section controls energizing of the electric heater based on the measured temperature of the catalytic combustor.

According to this structure, the electric heater can be energized only when the temperature of the catalytic combustor is lower than a predetermined temperature. Consequently, the electric heater is energized only when it is necessary, thereby reducing and minimizing the power consumption with respect to the electric heater.

As another typical example, the control section may start energizing of the electric heater before the boil-off gas included in the mixed gas is introduced into the catalytic combustor. In this case, the catalytic combustor can be preheated by energizing the electric heater before the boil-off gas is introduced into the catalytic combustor via the mixing device. Therefore, the catalyst can be activated before the introduction of the mixed gas, and the boil-off gas can be much more reliably burned.

Also in this case, the boil-off gas processing system may further comprise:

a discharge valve (e.g., a release valve 5 in the embodiment explained below) which is attached to the discharge passage and is opened when the pressure in the liquid hydrogen tank reaches a first predetermined pressure, wherein when the discharge valve is open, the boil-off gas is introduced into the mixing device, wherein the control section starts energizing of the electric heater when the pressure in the liquid hydrogen tank reaches a second predetermined pressure which is lower than the first predetermined pressure.

As another typical example, the electric heater has an electric heating wire (e.g., an electric heating wire 80 in the embodiment explained below) consisting of a heating wire (e.g., a heating wire 81 in the embodiment) and a catalyst (e.g., a catalyst 82 in the embodiment) which is adhered to a surface of the heating wire.

According to this structure, when the heating wire is energized, the catalyst adhered to the heating wire receives heat produced by the heating wire and is activated, so that the catalytic combustion of the mixed gas can be performed using the activated catalyst and the combustion gas produced by the catalytic combustion can heat and activate the catalyst of the downstream catalytic combustor. That is, the catalyst of the electric heater is first activated so as to perform the catalytic combustion of the mixed gas, and the downstream catalyst can be heated and activated by the combustion gas. Therefore, the boil-off gas can be immediately burned.

In the boil-off gas processing system, the discharge passage may be heated by waste heat of a combustion gas which is discharged from the catalytic combustor.

As a preferable example, a combustion gas passage (e.g., a combustion gas passage 12 in the embodiment explained below) for discharging the combustion gas is provided in a manner such that a portion of the discharge passage, disposed from the catalytic combustor to the upstream side of the electric heater, is surrounded by the combustion gas passage.

According to this structure, the catalytic combustor or the mixed gas before the introduction into the catalytic combustor can be heated by using waste heat of the combustion gas which passes through the combustion gas passage. Therefore, the combustion gas can assist the electric heater, so that the capacity or energizing time of the electric heater can be reduced. In addition, the combustion gas passage is provided in a manner such that a portion of the discharge passage, the portion being disposed from the catalytic combustor to the upstream side of the electric heater, is surrounded by the combustion gas passage. Therefore, all the heat of the combustion gas can be efficiently used and no additional heating device is necessary, so that the system size can be reduced.

DESCRIPTION OF THE PREFERRED EMBODIMENTS

Hereinafter, embodiments of the boil-off gas processing system according to the present invention will be explained with reference to the drawings (FIGS. 1 to 8).

The boil-off gas processing system is built into a vehicle, which is driven by a device using hydrogen, such as a hydrogen fueled engine or a fuel cell, that is, into a hydrogen fueled vehicle.

Figure 1:
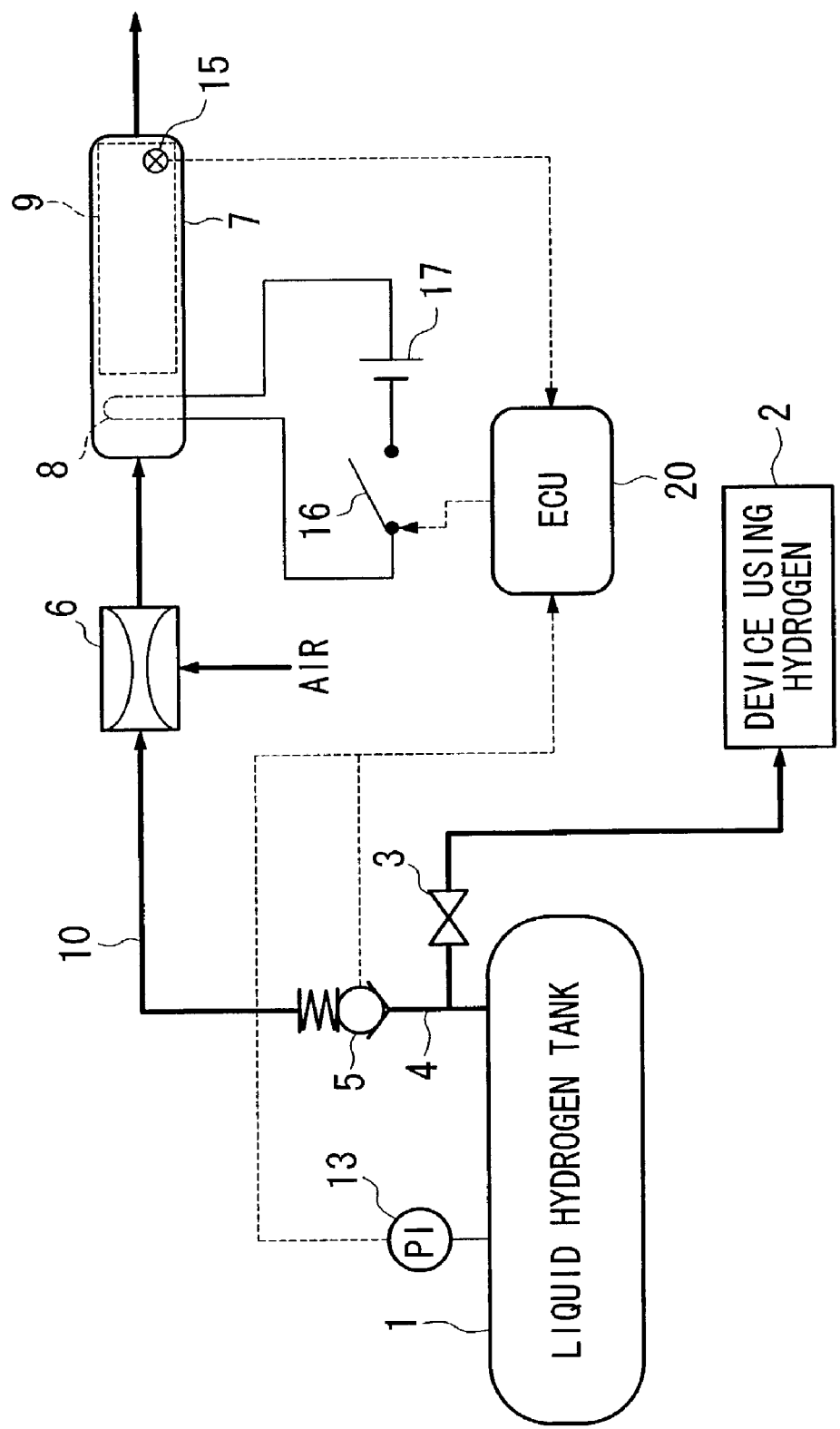
FIG. 1 is a diagram showing the general structure of an embodiment of the boil-off gas processing system according to the present invention.

FIG. 1 is a diagram showing the general structure of the boil-off gas processing system. Liquid hydrogen is stored in a liquid hydrogen tank 1, and hydrogen gas produced by vaporization of this liquid hydrogen is supplied as a fuel via a control valve 3 to a device 2 using hydrogen (such as a fuel cell or the like) while the device 2 is operated.

When the device 2 (using hydrogen) is stopped, if the temperature of the liquid hydrogen tank 1 is increased by external heat, vaporized hydrogen increases in the tank 1, thereby increasing the pressure in the tank 1. When the pressure in the liquid hydrogen tank 1 reaches a predetermined pressure P1, a release valve 5 (i.e., a discharge valve) attached to a gas outlet pipe 4 of the liquid hydrogen tank 1 is opened, so that vaporized hydrogen is discharged as a boil-off gas into a boil-off gas discharge passage 10. When the pressure in the liquid hydrogen tank 1 decreases to the above predetermined pressure P1 or lower, the release valve 5 is closed. Accordingly, the pressure in the liquid hydrogen tank 1 is maintained at the predetermined pressure P1 or lower. The release valve 5 outputs a valve-open signal to a central control unit 20 (i.e., ECU (electrical control unit)).

A pressure sensor 13 for measuring the pressure in the liquid hydrogen tank 1 is attached to the tank 1, and an output signal of the pressure sensor 13 is input into the ECU 20.

The boil-off gas discharged from the liquid hydrogen tank 1 via the release valve 5 is drawn via the boil-off gas discharge passage 10 into an ejector 6 (i.e., mixing device) and is then drawn into a catalytic combustor 7.

The catalytic combustor 7 is used for performing catalytic combustion of the boil-off gas, and air including oxygen, which functions as an oxidizing gas necessary for the catalytic combustion, is absorbed via the ejector from the atmosphere, and the air and the boil-off gas are mixed and supplied to the catalytic combustor 7.

Figure 2:
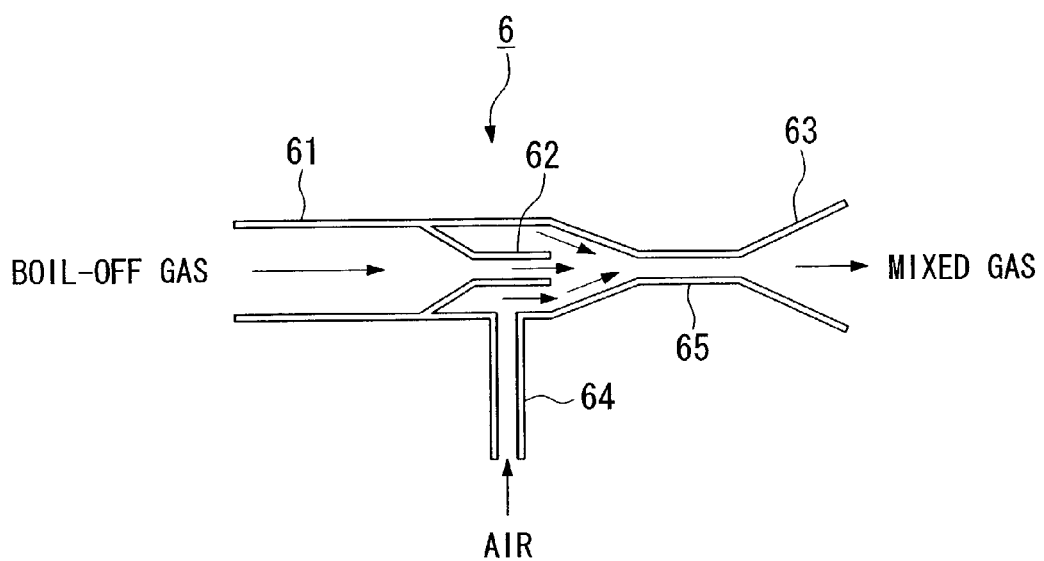
FIG. 2 is a general cross-sectional view showing the basic structure of the ejector.

The ejector 6 will be explained with reference to FIG. 2 which is a general cross-sectional view. The ejector 6 consists of a main pipe 61 functioning as an inlet for the boil-off gas, a nozzle 62 attached to a front end of the main pipe 61, a trumpet-shaped diffuser 63 positioned in front of the main pipe 61, and a sub pipe 64 which is connected to a base portion of the diffuser 63 and which functions as an inlet for the air. A middle portion of the diffuser 63 is narrowed to form a throat portion 65, and the outlet of the nozzle 62 faces the throat portion 65.

In this ejector 6, when a boil-off gas is ejected from the nozzle 62 towards the throat portion 65, a negative pressure is produced around the nozzle 62 and according to this negative pressure, air is drawn via the sub pipe 64, so that a mixed gas of the boil-off gas and the air is discharged from the diffuser 63.

Figure 3:
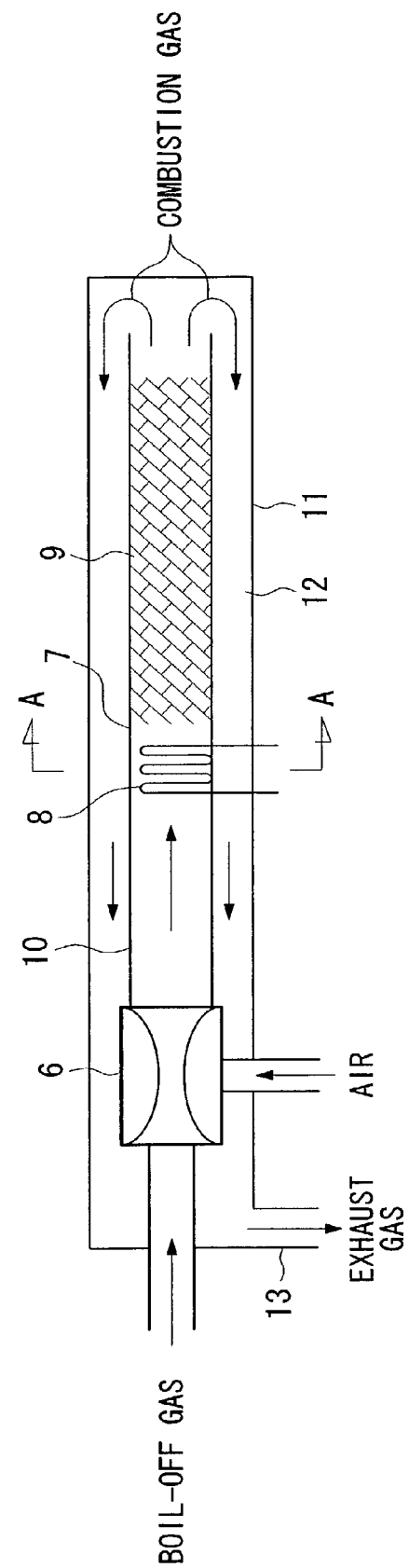
FIG. 3 is a diagram showing the combustion gas passage.
Figure 4:
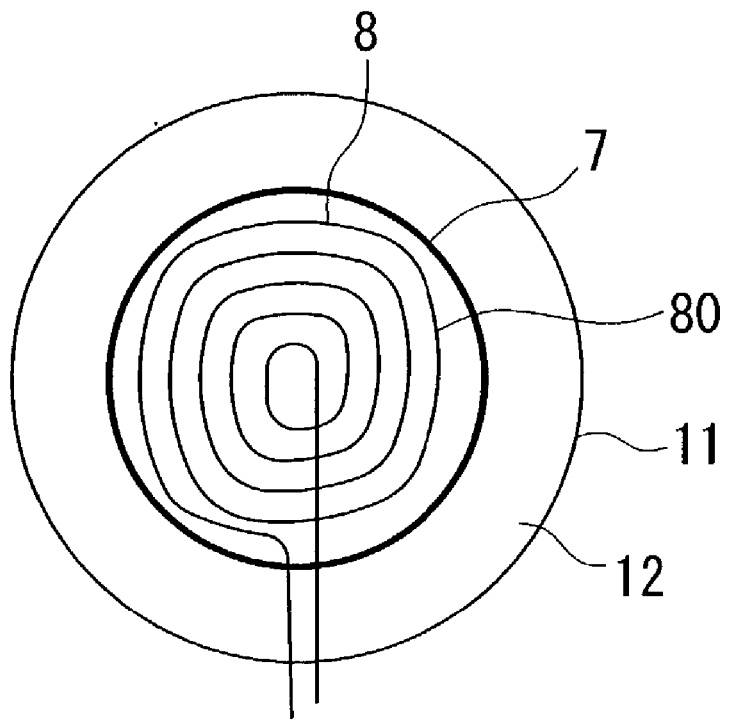
FIG. 4 is a sectional view along line A—A in FIG. 3.
Figure 5:
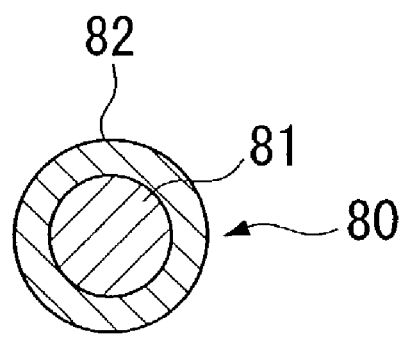
FIG. 5 is a sectional view of the electric heating wire which is a constituent of the electric heater.

The catalytic combustor 7 has an electric heater 8 at the inlet side (for the mixed gas), and a catalyst section 9 at the outlet side. As shown in FIGS. 3 to 5, the electric heater 8 has a structure in which an electric heating wire 80 is wound up to form a spiral shape and a plurality of spiral portions are serially arranged in a casing of the catalytic combustor 7. The electric heating wire 80 has a heating wire 81 made of Pt or the like, and a catalyst 82 made by using Pt-Black or the like is electrically deposited on the heating wire 81.

The catalyst section 9 has a honeycomb metal support which supports a catalyst (e.g., Pt). A temperature sensor 15 (i.e., temperature measuring section) for measuring the temperature of the catalytic combustor 7 (more specifically, the temperature of the catalyst section 9) is attached to the catalyst section 9, and an output signal of the temperature sensor 15 is input into the ECU 20. The electric heater 8 is connected to an electric circuit which includes a switch 16 and a battery 17, and when specific conditions are satisfied, the ECU 20 sets the switch 16 on so as to energize the electric heater 8.

As shown in FIG. 3, a portion of the boil-off gas discharge passage 10, in which the ejector 6 and the catalytic combustor 7 are provided, is surrounded by an outer tube 11, and a space between the discharge passage 10 and the outer tube 11 functions as a combustion gas passage 12 through which a combustion gas discharged from the catalytic combustor 7 passes. The outer tube 11 has an outlet 13 at a position closer to the release valve 5 rather than to the ejector 6. The combustion gas discharged from the catalytic combustor 7 flows from the outlet of the catalytic combustor 7 through the combustion gas passage 12 towards the ejector 6, and is then discharged from the outlet 13. That is, the combustion gas passage 12 is provided for discharging the combustion gas, which is output from the catalytic combustor 7, to the outside.

The operation of the boil-off gas processing system will be explained below.

The boil-off gas has an extremely low temperature (approximately −250° C.); thus, a mixed gas of the boil-off gas and the air discharged from the ejector 6 also has an extremely low temperature. Therefore, when such a mixed gas is introduced into the catalytic combustor 7, the catalyst in the catalyst section 9 may not reach an activation temperature at an initial stage of the introduction of the mixed gas. While the temperature of the catalyst does not reach the activation temperature, no catalytic reaction occurs. Therefore, the boil-off gas passes through and is then discharged from the catalytic combustor 7 without being burned.

In order to avoid such a situation, in the boil-off gas processing system of the present embodiment, the electric heater 8 is energized if such a situation is anticipated, so that the heating wire 81 is heated, thereby heating the catalyst 82 adhered to the heating wire 81. Therefore, the temperature of the catalyst 82 instantly increases to the activation temperature so that the catalyst 82 is activated. Accordingly, the mixed gas drawn from the ejector 6 into the catalytic combustor 7 at the initial stage is burned by the catalyst 82 of the electric heater 8, and the produced combustion gas flows through the downstream catalyst section 9, thereby heating the catalyst in the catalyst section 9. Consequently, the temperature of the catalyst in the catalyst section 9 quickly increases and reaches the activation temperature. Therefore, the following mixed gas introduced into the catalytic combustor 7 can be burned by the catalyst in the catalyst section 9. Accordingly, the mixed gas introduced from the ejector 6 into the catalytic combustor 7 can be reliably burned even in the initial stage of the introduction of the mixed gas, and it is possible to prevent a pre-burned boil-off gas from passing through the catalytic combustor 7 and being discharged.

As explained above, in the structure including the electric heater 8 which has the catalyst 82 and which is positioned at the upstream side of the catalyst section 9, power consumption necessary for quickly activating the catalyst section 9 can be reduced in comparison with another structure which does not employ the electric heater 8 but employs a heater in the catalyst section 9 so as to heat the entire catalyst section 9.

In addition, the combustion gas discharged from the catalytic combustor 7 flows through the combustion gas passage 12; thus, the catalytic combustor 7, the ejector 6, and the boil-off gas discharge passage 10 can be heated by using waste heat of the combustion gas. Therefore, it is possible to prevent water, included in the air which is drawn into the ejector 6, from freezing due to the boil-off gas which has an extremely low temperature. As a result, it is also possible to prevent the ejector 6 having a narrowed throat portion 65 or the boil-off gas discharge passage 10 from being blocked due to freezing. If fins are provided on the outer surface of the ejector 6, the ejector 6 can be much more quickly heated.

Additionally, the catalytic combustor 7 is heated by waste heat of the combustion gas; thus, the combustion gas can assist the electric heater 8 so as to further quickly increase the temperature of the catalyst section 9. As a result, the capacity or energizing time of the electric heater 8 can be reduced.

Figure 6:
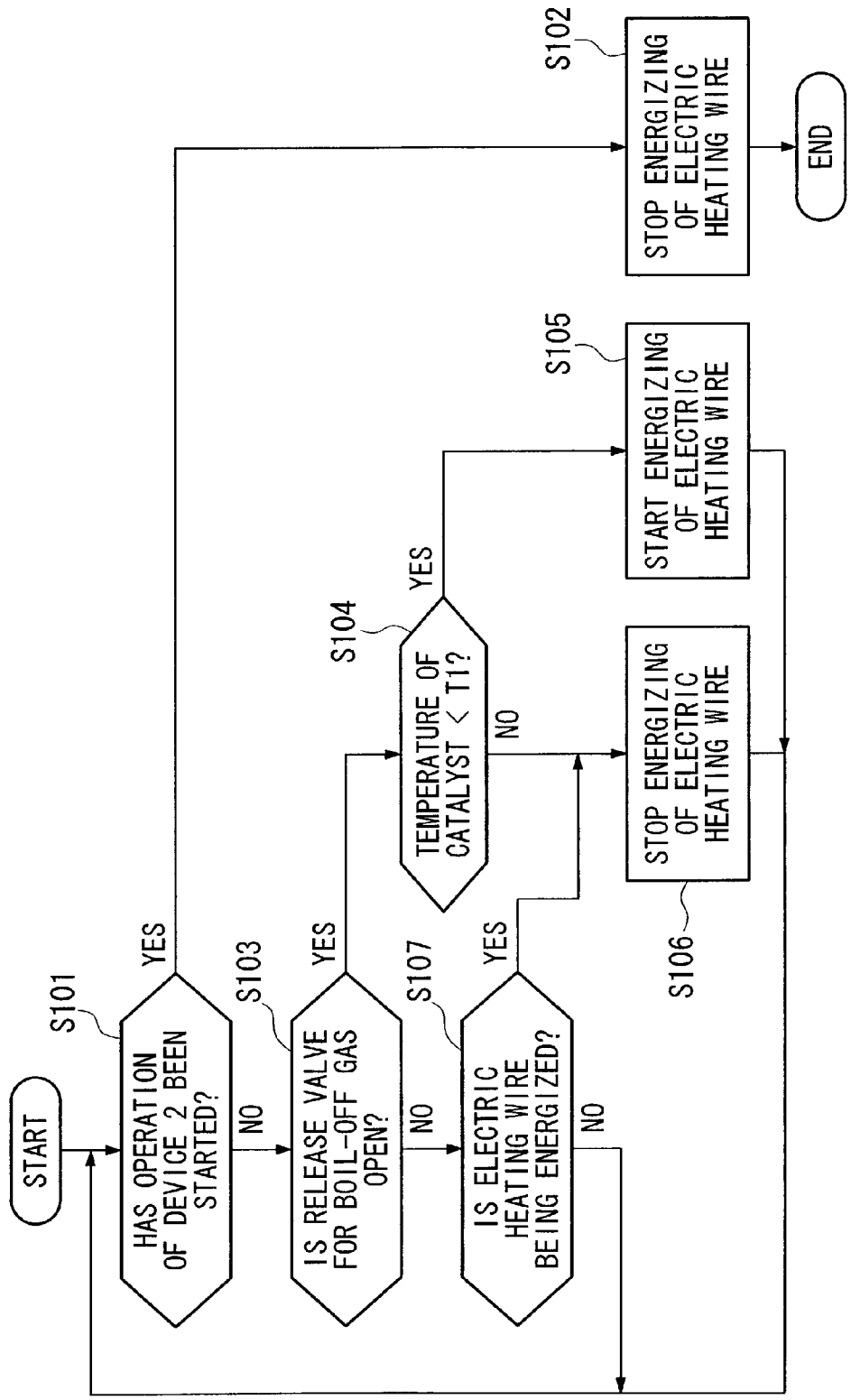
FIG. 6 is a flowchart showing the boil-off gas processing operation.

Below, the control operation (performed by the ECU 20) for processing the boil-off gas in the present embodiment will be explained with reference to the flowchart in FIG. 6.

In the first step S101, it is determined whether the operation of the device 2 (which uses hydrogen) has been started. While the device 2 operates, hydrogen is continuously supplied from the liquid hydrogen tank 1 to the device 2; thus, the pressure in the liquid hydrogen tank 1 does not exceed the predetermined pressure P1 for opening the release valve 5, so that no boil-off gas is introduced into the catalytic combustor 7. Therefore, if the result of the determination of step S101 is "YES" (i.e., the operation of the device 2 has been started), energizing of the electric heating wire 80 of the electric heater 8 is stopped (see step S102) and the control process of this flow is terminated.

If the result of the determination of step S101 is "NO" (i.e., the operation of the device 2 has not yet been started), the operation proceeds to step S103, where it is determined whether the release valve 5 is open. If the release valve 5 is open, the boil-off gas is introduced into the catalytic combustor 7, while if the release valve 5 is closed, no boil-off gas is introduced into the catalytic combustor 7.

If the result of the determination of step S103 is "YES" (i.e., the release valve 5 is open), the operation proceeds to step S104, where it is determined whether the temperature of the catalyst section 9 in the catalytic combustor 7 is lower than a predetermined temperature T1. If the result of the determination of step S104 is "YES" (i.e., the temperature of the catalyst is lower than T1), energizing of the electric heating wire 80 of the electric heater 8 is started (see step S105). That is, in this case, it is determined that the catalyst section 9 must be heated so as to burn the boil-off gas and thus the electric heater 8 is switched on, thereby performing the catalytic combustion of the catalyst 82 of the electric heater 8 and quickly activating the catalyst section 9. Accordingly, the boil-off gas is reliably burned even in the initial stage of the introduction of the boil-off gas into the catalytic combustor 7.

The predetermined temperature T1, a reference temperature for determining whether the electric heating wire 80 is energized, is suitably defined according to the activated state or amount of the catalyst carried by the catalyst section 9.

After the energizing of the electric heating wire is started in step S105, the control operation returns to step S101.

If the result of the determination of step S104 is "NO" (i.e., the temperature of the catalyst is T1 or higher), energizing of the electric heating wire 80 of the electric heater 8 is stopped (see step S106). That is, in this case, it is determined that the boil-off gas can be burned without heating the catalyst section 9, and the electric heater 8 is switched off.

On the other hand, if the result of the determination of step S103 is "NO" (i.e., the release valve 5 is closed), the operation proceeds to step S107, where it is determined whether the electric heating wire 80 of the electric heater 8 is being energized. If the result of the determination of step S107 is "NO" (i.e., not being energized), the operation immediately returns to step S101. If the result of the determination of step S107 is "YES" (i.e., being energized), energizing of the electric heating wire 80 is stopped because the release valve 5 has already been closed and the introduction of the boil-off gas into the catalytic combustor 7 has been stopped (see step S106), and the operation returns to step S101.

According to the above control, when the release valve 5 is closed, that is, when the boil-off gas is not introduced into the catalytic combustor 7, the electric heating wire 80 of the electric heater 8 is not energized, so that power consumption of the electric heater 8 is reduced.

Additionally, when the temperature of the catalyst section 9 in the catalytic combustor 7 is the predetermined temperature T1 or higher, the electric heating wire 80 of the electric heater 8 is not energized, and the electric heating wire 80 is energized only when the temperature of the catalyst section 9 is lower than the predetermined temperature T1, so that power consumption of the electric heater 8 can be reduced.

In particular, in the present embodiment, the electric heating wire 80 is energized only when the release valve 5 is open and simultaneously the temperature of the catalyst section 9 is lower than the predetermined temperature T1; thus, power consumption of the electric heater 8 can be suppressed to the minimum level necessary for energizing.

In the above-explained control for processing the boil-off gas, the electric heating wire 80 of the electric heater 8 is not energized before the release valve 5 is opened and the boil-off gas is introduced into the catalytic combustor 7. However, if the electric heater 8 can be preheated prior to the introduction of the boil-off gas into the catalytic combustor 7, an initially-introduced boil-off gas can be further quickly and reliably heated.

Figure 7:
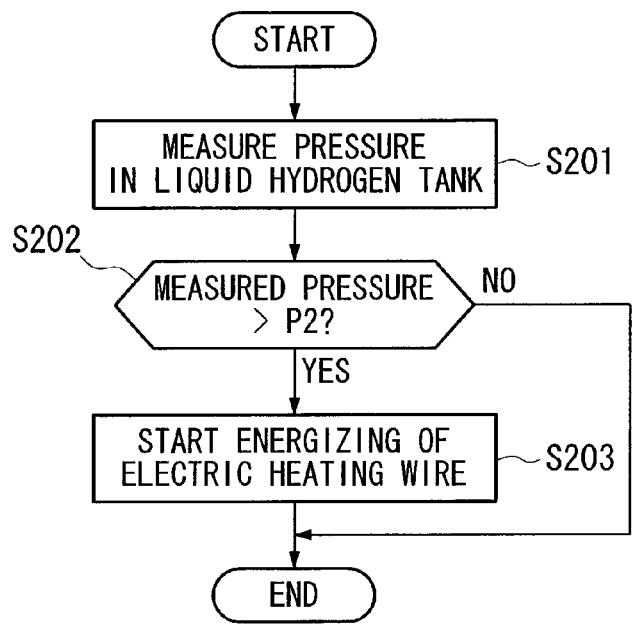
FIG. 7 is a flowchart showing the preheating process based on the voltage in the liquid hydrogen tank.
Figure 8:
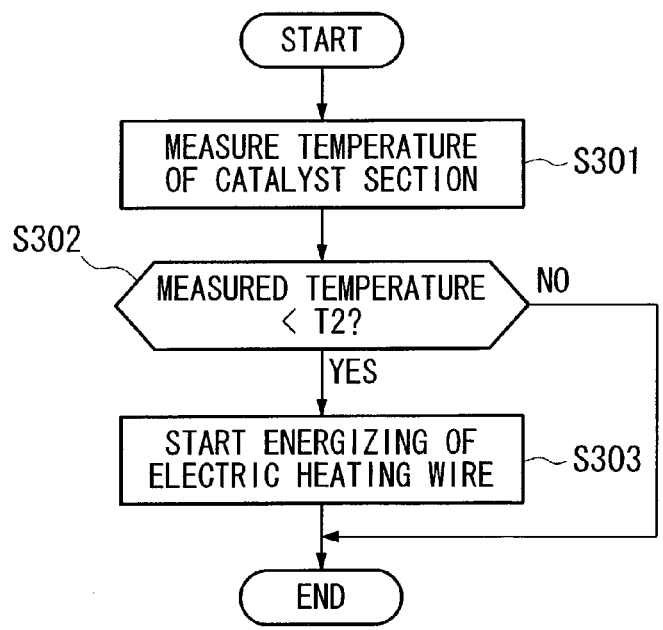
FIG. 8 is a flowchart showing the preheating process based on the temperature of the catalytic combustor.

FIGS. 7 and 8 are flowcharts showing possible preheating processes of the catalyst section 9, and each will be explained below.

FIG. 7 is a flowchart of a preheating process performed based on the pressure in the liquid hydrogen tank 1. This preheating process is executed when the result of the determination of step S101 is "NO" (i.e., when the device which uses hydrogen is stopped), and after this preheating process is completed, the operation shown in FIG. 6 proceeds to step S103.

In the first step S201 in FIG. 7, the pressure in the liquid hydrogen tank 1 is measured using the pressure sensor 13.

In the next step S202, it is determined whether the pressure in the liquid hydrogen tank 1 is higher than a second predetermined pressure P2. This second predetermined pressure P2 is determined in advance so as to satisfy the condition that the pressure P2 is lower than the above-explained predetermined pressure P1 (i.e., the first predetermined pressure) referred to for opening the release valve 5.

If the result of the determination of step S202 is "YES" (i.e., the internal pressure of the liquid hydrogen tank 1 is higher than P2), energizing of the electric heating wire 80 of the electric heater 8 is started (see step S203). Accordingly, the heating wire 81 of the electric heating wire 80 is heated, thereby heating the catalyst 82, and the heat is transmitted to the catalyst section 9 of the catalytic combustor 7 so that the catalyst section 9 is heated. However, at this stage, no boil-off gas has been drawn into the catalytic combustor 7; thus, no catalytic combustion occurs. According to the preheating of the catalyst 82 of the electric heating wire 80 and the catalyst in the catalyst section 9 as explained above, when the pressure in the liquid hydrogen tank 1 exceeds the pressure P1 (i.e., the first predetermined pressure) for opening the release valve 5 and a boil-off gas is introduced into the catalytic combustor 7, the boil-off gas can be immediately burned by the catalyst 82 and the catalyst in the catalyst section 9 can be immediately activated so as to perform the catalytic combustion. After step S203 is executed, the operation of this flow is completed.

If the result of the determination of step S202 is "NO" (i.e., the internal pressure of the liquid hydrogen tank 1 is equal to or lower than P2), it is determined that no preheating process is necessary and the operation of this flow is terminated.

FIG. 8 is a flowchart of a preheating process performed based on the temperature of the catalyst section 9. This preheating process is executed when the result of the determination of step S101 is "NO" (i.e., when the device which uses hydrogen is stopped), and after this preheating process is completed, the operation shown in FIG. 6 proceeds to step S103.

In the first step S301 in FIG. 8, the temperature of the catalyst section 9 is measured using the temperature sensor 15.

In the next step S302, it is determined whether the temperature of the catalyst section 9 is lower than a predetermined temperature T2.

If the result of the determination of step S302 is "YES" (i.e., the measured temperature is lower than T2), energizing of the electric heating wire 80 of the electric heater 8 is started (see step S303). Accordingly, the heating wire 81 of the electric heating wire 80 is heated, thereby heating the catalyst 82, and the heat is transmitted to the catalyst section 9 of the catalytic combustor 7 so that the catalyst section 9 is heated. However, at this stage, no boil-off gas has been introduced into the catalytic combustor 7; thus no catalytic combustion occurs. According to the preheating of the catalyst 82 of the electric heating wire 80 and the catalyst in the catalyst section 9 as explained, above, when the pressure in the liquid hydrogen tank 1 exceeds the pressure P1 (i.e., the first predetermined pressure) for opening the release valve 5 and a boil-off gas is introduced into the catalytic combustor 7, the boil-off gas can be immediately burned by the catalyst 82 and the catalyst in the catalyst section 9 can be immediately activated so as to perform the catalytic combustion. After step S303 is executed, the operation of this flow is completed.

If the result of the determination of step S302 is "NO" (i.e., the measured temperature is equal to or higher than T2), it is determined that no preheating process is necessary and the operation of this flow is terminated.

Both of the preheating process based on the pressure in the liquid hydrogen tank 1 and the preheating process based on the temperature of the catalyst section 9 may be performed. This is more effective and the boil-off gas can be reliably burned and discharged.

What is claimed is:

1. A boil-off gas processing system comprising:
    a hydrogen tank for storing liquid hydrogen used as fuel for a hydrogen fueled vehicle;
    a boil-off gas passage for discharging boil-off gas from said hydrogen tank;
    a mixing device for introducing air into the boil-off gas passage and for mixing the air and the boil-off gas and for outputting a mixed gas;
    a catalytic combustor for burning the mixed gas from the mixing device, the catalytic combustor having an inlet for receiving the mixed gas, a catalyst section including a catalyst, and an outlet for discharging combustion gas;
    an electric heater provided between the inlet and the catalyst section for heating the mixed gas;
    a control section for controlling operation of the electric heater;
    a combustion gas passage for discharging the combustion gas, and configured to surround at least a portion of the boil-off gas passage from the catalytic combustor to an upstream side of the electric heater relative to a flow direction of the boil-off gas, wherein said portion is heated by waste heat of the combustion gas passing through the combustion gas passage; and
    an outer tube for surrounding the combustion gas passage, wherein the combustion gas passage is formed between the boil-off gas passage and the outer tube,
    wherein the mixing device, the electric heater, and the catalyst section are aligned in the boil-off gas passage so that the boil-off gas passes substantially straight through the mixing device, the electric heater, and the catalyst section.

2. A boil-off gas processing system as claimed in claim 1, further comprising:
    a discharge valve provided in the boil-off gas passage and is adapted to open for discharging the boil-off gas from the hydrogen tank when an internal pressure in the hydrogen tank reaches a predetermined pressure,
    wherein the control section controls operation of the electric heater and the electric heater is energized for heating the mixed gas when the discharge valve is opened.

3. A boil-off gas processing system as claimed in claim 1, further comprising:
    a temperature measuring section for measuring a temperature of the catalytic combustor,
    wherein the control section controls energization of the electric heater in response to a temperature of the catalytic combustor obtained by the temperature measuring section.

4. A boil-off gas processing system as claimed in claim 2, further comprising:
    a temperature measuring section for measuring a temperature of the catalytic combustor,
    wherein the control section controls energization of the electric heater in response to a temperature of the catalytic combustor obtained by the temperature measuring section.

5. A boil-off gas processing system as claimed in claim 1, wherein:
    the control section is adapted to energize the electric heater before the boil-off gas included in the mixed gas is introduced into the catalytic combustor.

6. A boil-off gas processing system as claimed in claim 5, further comprising:
    a discharge valve provided in the boil-off gas passage and is adapted to an open position when an internal pressure in the hydrogen tank reaches a first predetermined pressure, wherein when the discharge valve is open, the boil-off gas is introduced into the mixing device,
    wherein the control section is adapted to energize the electric heater when the pressure in the hydrogen tank reaches a second predetermined pressure which is lower than the first predetermined pressure.

7. A boil-off gas processing system as claimed in claim 1, wherein the electric heater has an electric heating wire consisting of a heating wire and a catalyst which is adhered to a surface of the heating wire.

* * * * *